(12) United States Patent
Jiang et al.

(10) Patent No.: US 10,489,510 B2
(45) Date of Patent: Nov. 26, 2019

(54) SENTIMENT ANALYSIS OF PRODUCT REVIEWS FROM SOCIAL MEDIA

(71) Applicant: Ford Global Technologies, LLC, Dearborn, MI (US)

(72) Inventors: Zhen Jiang, Mountain View, CA (US); Xianfeng Hu, Warren, MI (US); Yan Fu, Bloomfield Hills, MI (US); Yao Ge, Northville, MI (US); Jian Fang, Troy, MI (US)

(73) Assignee: Ford Motor Company, Dearborn, MI (US)

( * ) Notice: Subject to any disclaimer, the term of this patent is extended or adjusted under 35 U.S.C. 154(b) by 252 days.

(21) Appl. No.: 15/492,934

(22) Filed: Apr. 20, 2017

(65) Prior Publication Data

US 2018/0307677 A1   Oct. 25, 2018

(51) Int. Cl.
| | | |
|---|---|---|
| *G06F 17/27* | (2006.01) | |
| *G06Q 30/06* | (2012.01) | |
| *G06N 20/00* | (2019.01) | |
| *G06Q 50/00* | (2012.01) | |
| *G06N 7/00* | (2006.01) | |
| *G06N 20/10* | (2019.01) | |

(52) U.S. Cl.
CPC ...... *G06F 17/2785* (2013.01); *G06F 17/2735* (2013.01); *G06N 7/005* (2013.01); *G06N 20/00* (2019.01); *G06N 20/10* (2019.01); *G06Q 30/0631* (2013.01); *G06Q 50/01* (2013.01)

(58) Field of Classification Search
CPC ..................................................... G06F 17/27

USPC .............. 704/9; 715/760; 709/224; 707/749, 707/748, 739
See application file for complete search history.

(56) References Cited

U.S. PATENT DOCUMENTS 6,751,600 B1 * 6/2004 Wolin ................... G06F 16/353
                                                        706/12
6,807,518 B1   10/2004 Lang
              (Continued)

FOREIGN PATENT DOCUMENTS

| CN | 105335352 | 2/2016 |
|---|---|---|
| CN | 105760502 | 7/2016 |

OTHER PUBLICATIONS

Qingqing Zhou, Sentiment Classification of Chinese Reviews in Different Domain: A Comparative Study, Department of Information Management, Nanjing University of Science, China.
(Continued)

*Primary Examiner* — Michael C Colucci
(74) *Attorney, Agent, or Firm* — David R. Stevens; Stevens Law Group

(57) ABSTRACT

User generated content, particularly Chinese language content, is retrieved from various sources such as forums, microblogs, social media sites, and the like. A portion of the content is manually labeled with a sentiment associated with the content and may be classified according to subject matter referenced. Sentiment-indicating features of the content is extracted according to a sentiment dictionary, which may include topic-specific jargon. The features are used to train a classifier to determine sentiment of content based on sentiment-indicating features. The sentiment for other content may then be determined using the classifier. The output of the classifier may be combined with an explicit rating of a product or product feature.

15 Claims, 6 Drawing Sheets

(56) References Cited

U.S. PATENT DOCUMENTS

| | | | |
|---|---|---|---|
| 8,868,554 B1* | 10/2014 | Acton | G06Q 30/06 |
| | | | 707/736 |
| 8,909,771 B2* | 12/2014 | Heath | G06Q 30/02 |
| | | | 705/39 |
| 9,336,192 B1* | 5/2016 | Barba | G06F 17/277 |
| 9,438,732 B2 | 9/2016 | Skiba | |
| 9,471,883 B2 | 10/2016 | Chatterjee | |
| 2007/0078699 A1* | 4/2007 | Scott | G06Q 10/063 |
| | | | 707/713 |
| 2007/0250468 A1* | 10/2007 | Pieper | G06F 16/958 |
| 2008/0249764 A1* | 10/2008 | Huang | G06F 17/2785 |
| | | | 704/9 |
| 2008/0288324 A1* | 11/2008 | Graczynski | G06Q 10/00 |
| | | | 705/7.14 |
| 2009/0048823 A1* | 2/2009 | Liu | G06F 17/2745 |
| | | | 704/9 |
| 2009/0063247 A1 | 3/2009 | Burgess | |
| 2009/0281870 A1* | 11/2009 | Sun | G06Q 10/10 |
| | | | 705/7.29 |
| 2009/0299824 A1* | 12/2009 | Barnes, Jr. | G06F 3/04847 |
| | | | 705/7.39 |
| 2010/0169317 A1* | 7/2010 | Wang | G06F 17/277 |
| | | | 707/736 |
| 2010/0205550 A1* | 8/2010 | Chen | G06Q 10/10 |
| | | | 715/760 |
| 2011/0029926 A1 | 2/2011 | Hao | |
| 2011/0113027 A1* | 5/2011 | Shen | G06F 17/248 |
| | | | 707/723 |
| 2011/0173191 A1 | 7/2011 | Tsaparas | |
| 2012/0246054 A1* | 9/2012 | Sastri | G06Q 40/06 |
| | | | 705/37 |
| 2013/0066873 A1* | 3/2013 | Salvetti | G06Q 30/0278 |
| | | | 707/738 |
| 2013/0097176 A1* | 4/2013 | Khader | G06Q 30/0251 |
| | | | 707/748 |
| 2013/0132366 A1* | 5/2013 | Pieper | G06F 16/9535 |
| | | | 707/710 |
| 2014/0337257 A1* | 11/2014 | Chatterjee | G06F 16/93 |
| | | | 706/12 |
| 2015/0178279 A1* | 6/2015 | Chen | G06Q 50/01 |
| | | | 707/748 |
| 2016/0098479 A1* | 4/2016 | Anwar | G06F 16/3344 |
| | | | 707/728 |
| 2016/0188597 A1* | 6/2016 | Moore | G06F 16/24578 |
| | | | 707/749 |
| 2017/0078621 A1* | 3/2017 | Sahay | G06F 16/51 |
| 2017/0109448 A1* | 4/2017 | Adamy | G06F 16/24578 |
| 2018/0260385 A1* | 9/2018 | Fan | G06F 17/2785 |
| 2018/0307677 A1* | 10/2018 | Jiang | G06F 17/2785 |

OTHER PUBLICATIONS

Fei Gao, Chinese Micro-blog Sentiment Analysis Based on Semantic Features and PAD Model, Hefei University of Technology, Hefei, China.

Cui Anqi, Lexicon-based Sentiment Analysis on Topical Chinese Microblog Messages, Department of Computer Science and Technology, Tsinghua University, Beijing.

* cited by examiner

SENTIMENT ANALYSIS OF PRODUCT REVIEWS FROM SOCIAL MEDIA

BACKGROUND

Field of the Invention

This invention relates to gathering consumer information from social media postings.

Background of the Invention

With the boom of social media and e-commerce customers not only buy products online but also share their purchase experience online. Over 90% of Chinese consumers learn about products via social media and two thirds of them are influenced by online review s when they make decisions. Product reviews from social media are a very rich and useful resource not only for potential consumers but also for manufacturers. Analyzing the social media reviews will enable manufacturers to understand whether customers like a product.

The system and methods disclosed herein provide an improved approach to determining customer sentiment from social media data.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
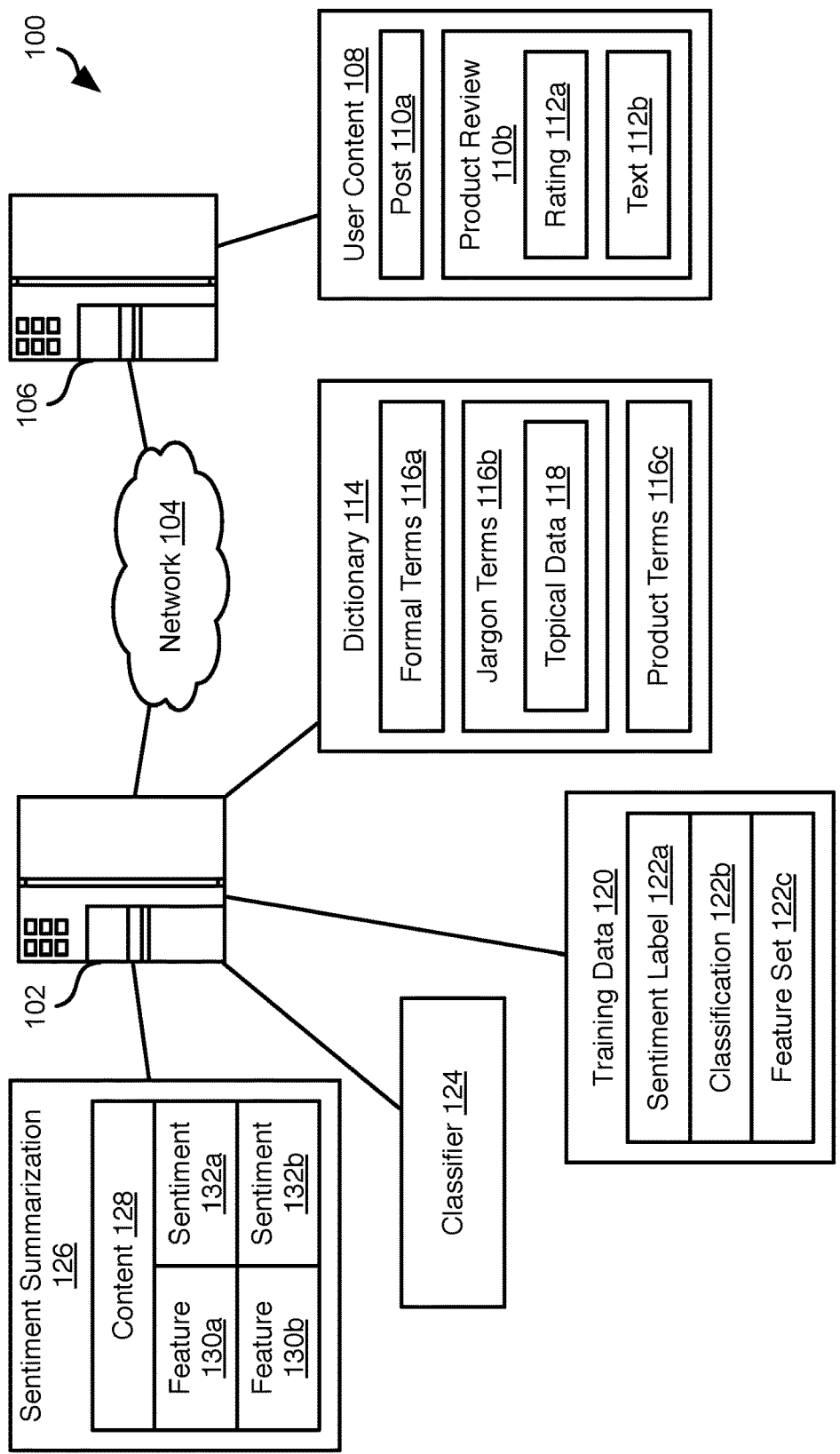
FIG. 1 is a schematic block diagram of a system for implementing embodiments of the invention.

Referring to FIG. 1, the methods disclosed herein may be practiced in a network environment 100 including some or all of the illustrated components. The methods disclosed herein may be executed by a server system 102 comprising one or more computing device having one or more processing devices. The server system 102 may process social media data retrieved over a network 104, such as the Internet, from one or more server systems 106. Each server systems 106 may host a social media platform, microblogging site, forum, industry-specific site, or other site that allows posting of content generated by consumers or experts in a particular area or industry.

The server systems 106 may enable the creation, storage, and access of user content 108. The user content 108 may include a post 110a that is in the form of unstructured text. The user content 108 may further include product reviews 110b that may include an explicit rating 112a (e.g., 1 to 5 stars) of a product or multiple product features as well as unstructured text 112b. As described in detail below, some product reviews 110b may include explicit ratings for individual features of a product and/or an explicit rating for a product as a whole along with unstructured text providing an explanation of the reviewer's opinion.

The server system 102 may also compile or access a dictionary 114. The dictionary 114 may include entries including a term or phrase and a sentiment associated with the phrase. Entries may include a set of terms that represent different forms (conjugation, gender, plural, declension, etc.) of a term. The sentiment may be expressed in a binary form (positive or negative) or a numerical value within a range (high value indicating a more positive sentiment and a lower value indicating a more negative sentiment).

In some embodiments, the dictionary 114 may include formal terms 116a from a formal dictionary with the sentiment corresponding to formal definitions for the terms. The dictionary 114 may further include entries 116b for jargon terms. In some instances, jargon terms are only applicable in certain topical contexts. Accordingly, one or more entries may have topical data 118 indicating where the jargon meaning of a term is applicable. As for the formal terms, the entries 116b may indicate the sentiment for a particular jargon term.

The dictionary 114 may further include product terms 116c. The product terms may include entries that include a product name and one or more pieces of information for that product name such as one or more nicknames for that product and a listing of features of the product identified by the product name.

The server system 102 may generate, store, and/or access training data 120. The training data 120 may include a plurality of training data entries that each correspond to a social media element, which may be a post 110a, product review 110b, or a portion thereof. For example, the social media element for an entry may be a portion of a post 110a or product review 110b corresponding to a single product or a particular feature or function of a product. Each entry may include a sentiment label 122a, classification 122b, and feature set 122c. The sentiment label 122a may be human-generated rating of the sentiment of the social media element for the entry. For example, the sentiment label 122a may be a binary label indicating a positive or negative sentiment. Alternatively, the sentiment label 122a may be a numerical value from within a range, where a lower value indicates a more negative sentiment and a higher value indicates a more positive sentiment. The classification 122b may indicate a user estimate of the product and/or product feature that is referenced by the social media element for the entry.

The feature set 122c of an entry for a social media element may include an output of a segmentation and natural language processing algorithm that identifies words and phrases in the social media element that are likely to indicate sentiment and tags the words and phrases with a part-of-speech estimate (noun, adjective, adverb, etc.).

The entries of the training data 120 may be used to train a classifier 124. The classifier 124 may be a model according to any machine learning algorithm known in the art, such as a support vector machine (SVM), Bayesian (direct Bayesian or Bernoulli naïve Bayesian), or the like. In particular, the classifier 124 may be trained to output a sentiment for a given set of features extracted from a social media element. The classifier 124 may also be trained to classify the product or product feature referenced by a social media element. Accordingly, when inputting the entries, the feature set 122*c* of the entry is the input and the sentiment label 122*a* and/or classification 122*b* may be the desired output for the feature set 122*c*.

Using the classifier, social media elements from other user content 108 may be processed using the classifier 124 to obtain one or both of a sentiment estimate and a classification of the social media element. For example, a post 110*a* or product review 110*b* may be processed according to the classifier 124 to obtain a sentiment summarization 126. The summarization 126 may include the actual user-generated content 128 of the social media element and a listing of product features 130*a*-130*b* and a sentiment 132*a*-132*b* estimated for each product feature 130*a*-130*b*.

The manner in which the classifier 124 is generated and used is described in greater detail below.

Figure 2:
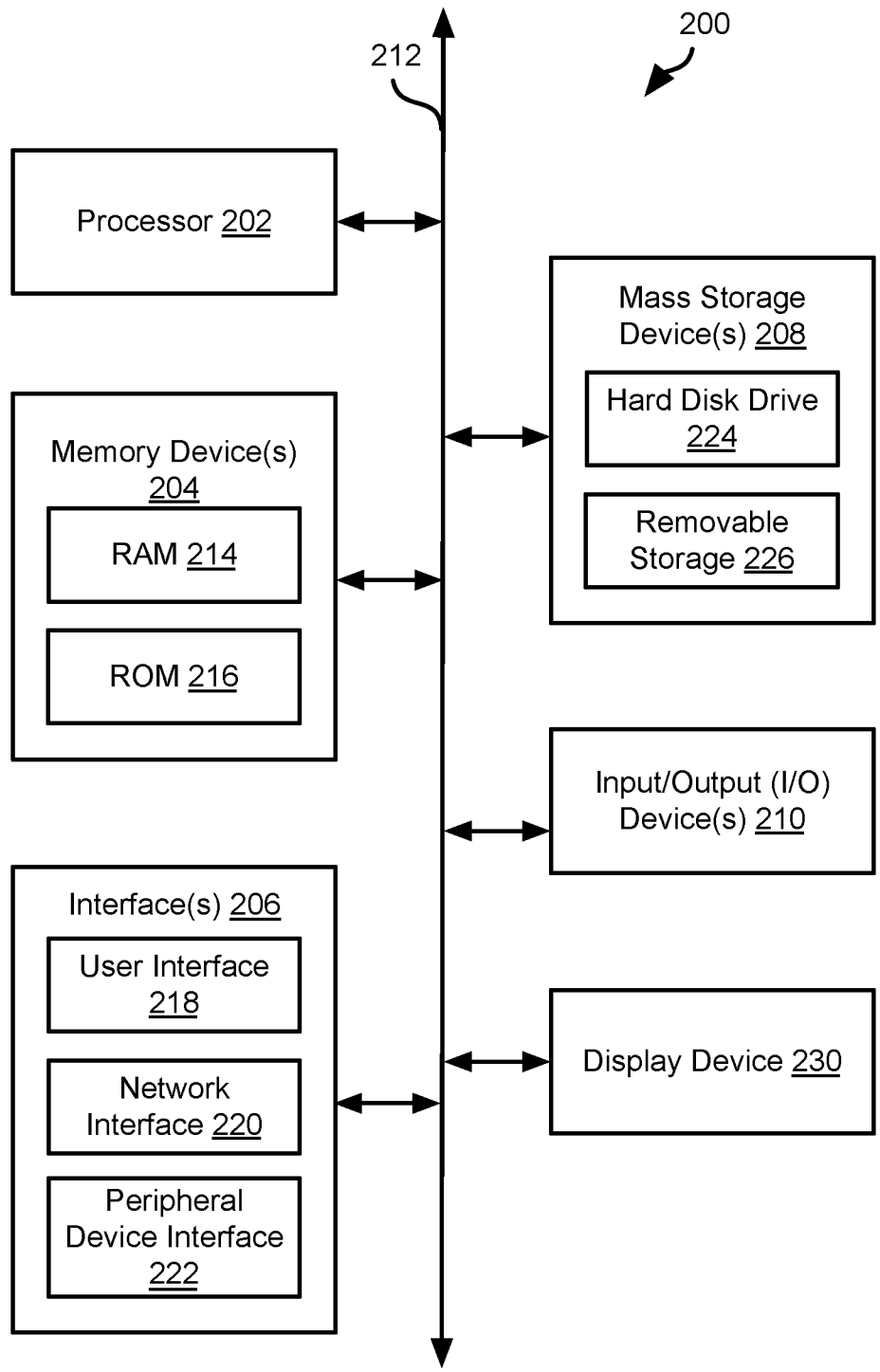
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The server systems 102, 106 may have some or all of the attributes of the computing device 200 and may incorporate one or more computing devices 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
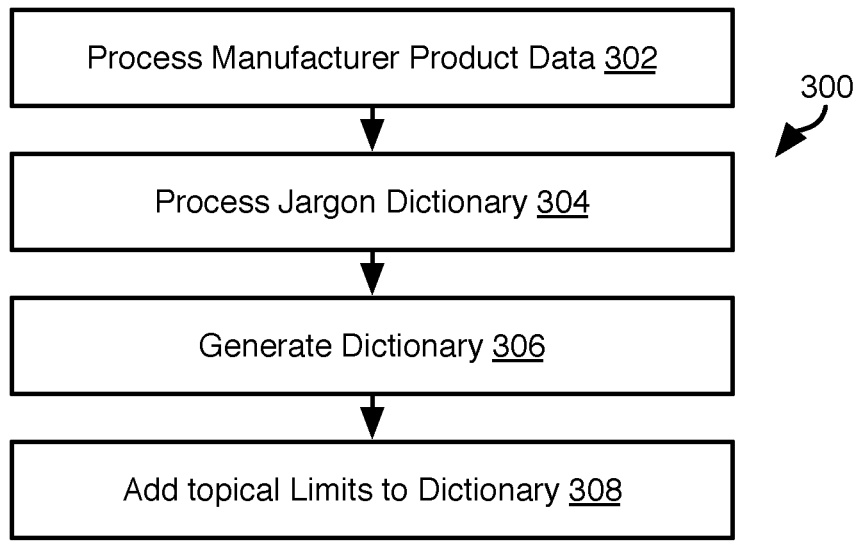
FIG. 3 is a process flow diagram of a method for generating a dictionary in accordance with an embodiment of the present invention.

Referring to FIG. 3, the illustrated method 300 may be executed by the server system 102 in order to generate the dictionary 114. In some embodiments, the dictionary 114 may already exist as a result of human judgment and the method 300 will not be executed.

The method 300 may include processing 302 manufacturer product data. The manufacturer data may be obtained by a web crawler that periodically collects data from manufacturer web sites, such as using the architecture described below with respect to FIG. 9. Processing 302 the manufacturer product data may include extracting product names and product nicknames from content of the manufacturer websites. In some embodiments, product names are extracted from manufacturer web sites and product nicknames are extracted from user-generated content. For example, correlations between content referencing a nickname and a manufacturer provided name and product description.

Product names and any mapping between a product name and one or more nicknames may be stored as an entry 116*c* in the dictionary 114. One or more product features extracted from the manufacturer data or user-generated content may also be added to the entry for a product.

The method 300 may further include processing 304 one or more jargon dictionaries. Communities have a tendency to develop their own jargon. This is particularly true for online communities. Dictionaries that define jargon for some online communities or technology areas. For example, HOWNET contains a listing of 3,969 positive words and 3,755 negative words in simplified Chinese. In another example, NTUSD (National Taiwan University Semantic Dictionary) contains 2,648 positive words and 7,742 negative words in traditional Chinese. Accordingly, step 304 may include ingesting such dictionaries and generating 306 the dictionary 114 by adding the sentiment-indicating terms from them to the dictionary 114. For example, for a term in the jargon dictionary, an entry may be added to the dictionary 114 that maps that term to the sentiment associated with one or more terms in the definition for that term in the jargon dictionary.

The invention described herein is particularly useful for Chinese language user content. One Chinese language jargon dictionary is HOWNET. Examples of Internet jargon that is currently in use includes the Chinese characters for "I'm drunk," which actually mean "I'm speechless" or "it doesn't make sense." Accordingly, generating 306 the dictionary may include adding this term to the dictionary 114 with a negative sentiment associated therewith. In another example, the Chinese character for "bright" is used to describe the luminance of the screen, but wouldn't be applicable to other electronic devices without a screen.

As noted above, jargon terms 116b may have only topical relevance. Accordingly, the topical data 118 describing the content in which a jargon term is applicable may be added 308 to the dictionary 114 along with a jargon term 116b. This topical data may be extracted from the jargon dictionary from which the term is retrieved. Where the jargon dictionary is for a particular technology area, this technology area may be added 308 as the topical data 118 for terms extracted from that jargon dictionary.

Figure 4:
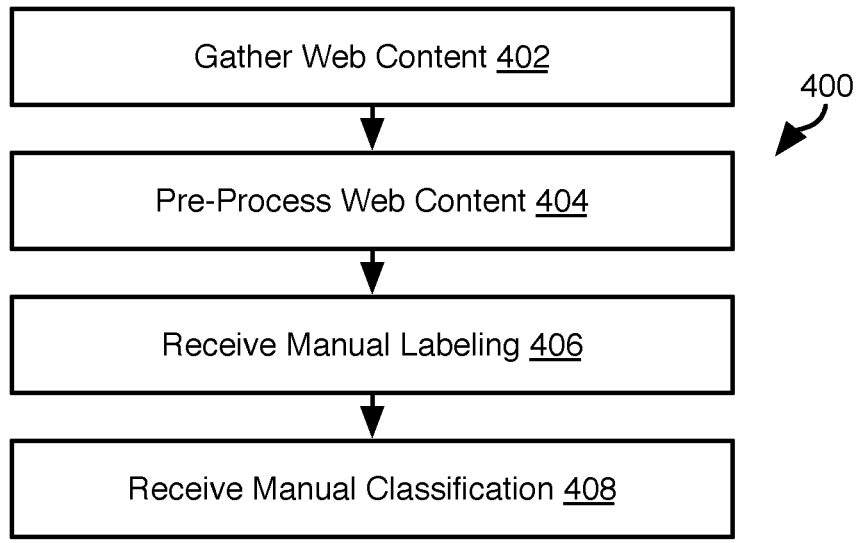
FIG. 4 is a process flow diagram of a method for generating training data in accordance with an embodiment of the present invention.

Referring to FIG. 4, the illustrated method 400 may be executed by the server system 102 in order to generate training data 120 for training the classifier 124. Note that the method 400 involves manual input of sentiment labels and classifications. Accordingly, some or all of the steps of the method 400 may also be performed on a user laptop, desktop, or mobile computing device in cooperation with the server system 102.

The method 400 may include gathering 402 web content. This may include web crawling the World Wide Web in a methodical automated manner. In particular, content may be gathered from forums and microblogs and other sources of user-generated content, such as social media data. Gathering 402 of web content may be invoked by a scheduler that iteratively analyzes web pages accessible from a plurality of URLs. Web pages may be retrieved by a multi-thread downloader to enable retrieval of content from multiple sources in an efficient manner. URLs may be ordered in a queue such that they are processed in an orderly manner and new content is retrieved on a periodic basis. An example architecture for gathering 402 web content is descried below with respect to FIG. 9.

The method 400 may further include pre-processing 404 the web content gathered at step 402. Pre-processing 404 may include correcting spelling and grammatical errors. For character-based languages, such as Chinese, auto-correction may not be implemented for many sources of content. Accordingly, correction of spelling and grammatical errors facilitates accurate processing of such content.

The method 400 may further include receiving 406 manual labelling of the web content and receiving 408 a manual classification of the web content. In particular, a label and classification may be received for social media elements from web content, e.g. an individual posting or product review or an individual sentence or paragraph of a posting or product review.

Steps 406, 408 for a social media element may include receiving an input from a human user indicating that user's estimate of the sentiment and a classification for that social media element. The sentiment may include a binary value (positive or negative) or a value within a range with a higher value indicating a more positive sentiment and a lower value indicating a more negative sentiment. The classification may indicate a class of product with any degree of specificity (automobile, sedan, FORD sedan, or FORD FUSION). The classification may indicate a feature of a product or class of products with any degree of specificity (engine, acceleration, handling, infotainment system, etc.).

Figure 5:
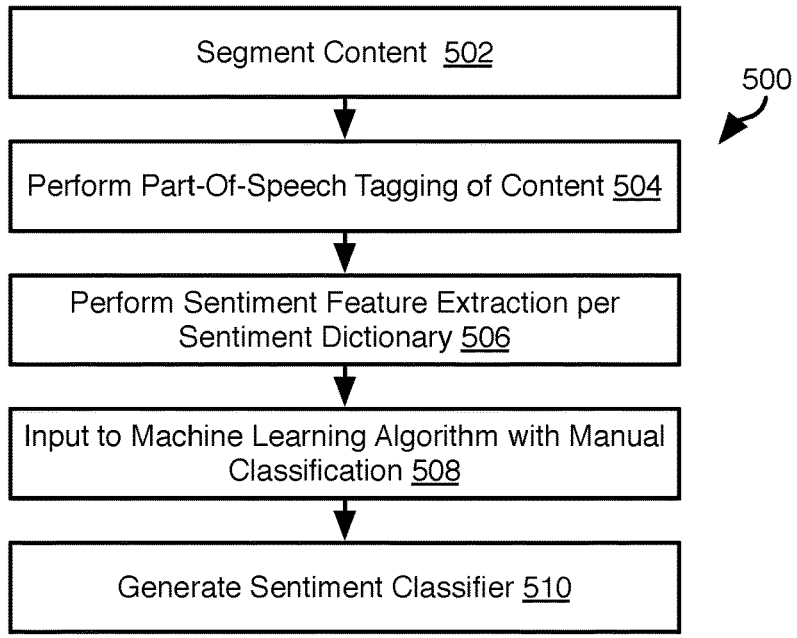
FIG. 5 is a process flow diagram of a method for training a classifier using training data in accordance with an embodiment of the present invention.

Referring to FIG. 5, the illustrated method 500 may be executed by the server system 102 to train a classifier 124 using social media elements labeled according to the method 400.

The method 500 may include segmenting 502 the content that was labeled and/or classified according to the method 400. Specifically, social media elements that was labeled and/or classified according to the method 400 may be segmented 502 into words and phrases and these words and phrases may be tagged 504 with a part of speech (noun, noun phrase, article verb, adjective, adverb, etc.) according to natural language processing (NLP) techniques. As noted above, the methods disclosed herein are particularly useful for Chinese or other pictograph-based languages (e.g. Japanese). In such languages, there may not be a clear boundary between characters. Accordingly, any Chinese language lexical analysis tool known in the art may be used to perform the segmentation of each social media element and tag each segment with a part of speech.

The method 500 may further include performing 506 sentiment feature extraction. Performing 506 sentiment feature extraction may include identifying words or phrases that indicate sentiment, whether positive or negative. Accordingly, extracting sentiment features may include identifying words and phrases in the social media element that match one or more sentiment terms of the dictionary 114, such as the formal sentiment terms 116a or the jargon terms 116b. Note that segments are tagged with an estimate of the part of speech filled by that segment. Accordingly, step 506 may include matching the segment or one or more words of the segment to a term in the dictionary 114 that is labeled with the same part of speech as the segment.

In the case of jargon terms 116b that are limited in applicability to topical data 118, extracting sentiment features may include evaluating whether both the words of a segment match a jargon term 116b and whether a topic of the social media element matches the topical data 118. A segment may be determined to be a sentiment feature if both one or more words match the jargon term 116b and the topic of the social media element matches the topic data 118 for that term. Determining a topic of a posting or social media element included in a posting may be performed using any textual analysis tool known in the art for determining the topic of a document.

The method 500 may then include inputting 508 training data to a machine learning algorithm. The training data may include entries that each include the sentiment features extracted for a social media element as an input and one or both of the manual sentiment label and classification for that social media element as desired outputs. In some embodiments, the social media element itself may be one of the inputs for an entry of training data. The machine learning algorithm ingests the training data and generates 510 a sentiment classifier 124.

Figure 6:
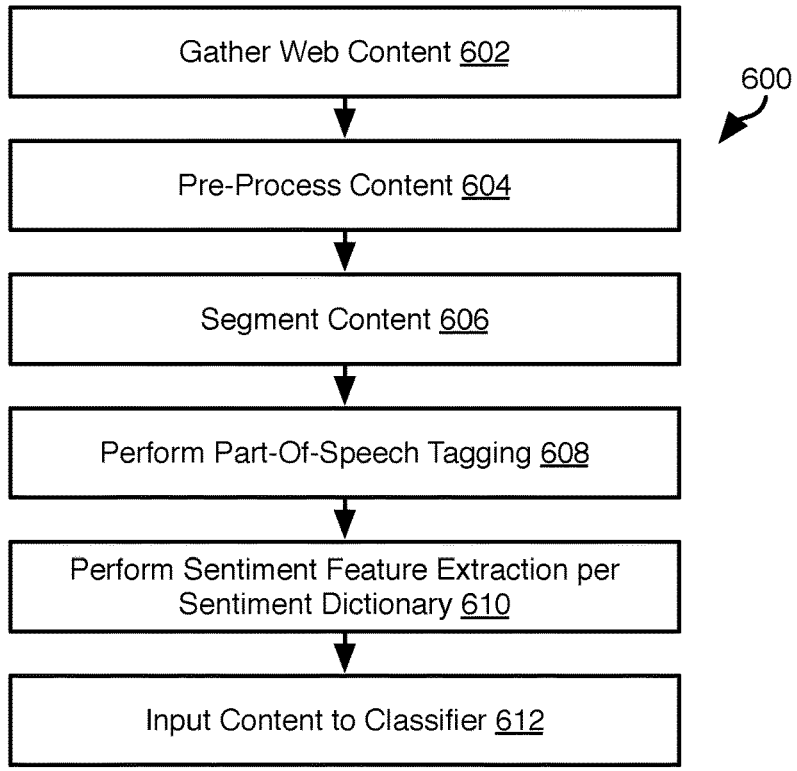
FIG. 6 is a process flow diagram of a method for determining sentiment of social media data using a classifier in accordance with an embodiment of the present invention.

Referring to FIG. 6, the illustrated method 600 may be executed by the server system 102 in order to use the classifier 124 to estimate the sentiment of social media elements, such as social media elements other than those used to create the classifier 124 according to the method 500.

The method 600 may include gathering 602 web content, pre-processing 604 the web content, segmenting 606 the web content, performing 608 part-of-speech tagging, and performing 610 sentiment feature extraction. Gathering 602 of web content and pre-processing 604 the content may be performed in the same manner as steps 402 and 404 of the method 400. Segmenting 606, performing 608 part-of-speech tagging, and performing 610 sentiment feature extraction may be performed in the same manner as steps 502-506 of the method 500. The result of step 610 is a set of sentiment features for a social media element that is either an item of web content or a portion of an item of web content retrieved at step 602.

The sentiment features of step 610 for each social media element may then be input 612 to the classifier 124 either with or without the social media element from which the features were extracted. The classifier 124 then outputs one or both of a sentiment estimate and a classification (product and/or product feature) of the subject matter of the social media element.

Figure 7:
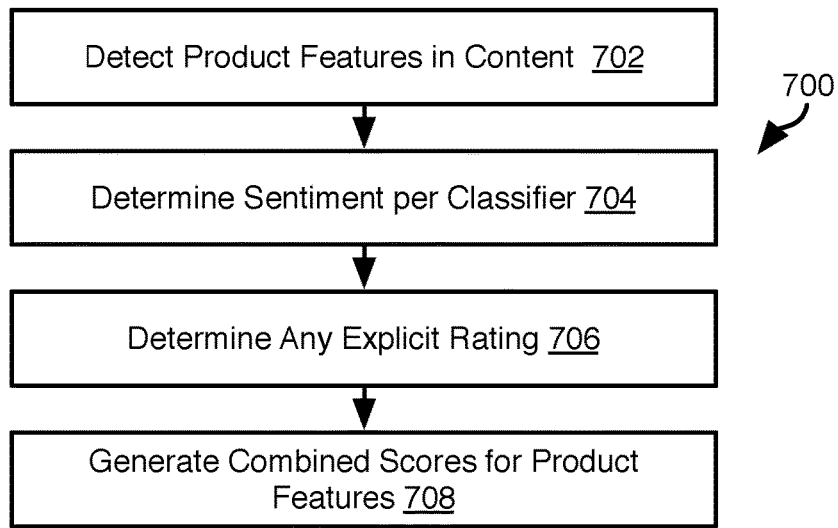
FIG. 7 is a process flow diagram of a method for associating sentiment with product features according to social media data in accordance with an embodiment of the present invention.

FIG. 7 illustrates a method 700 that may be executed by the server system 102 to characterize consumer sentiment associated with a particular product feature. The method 700 may be performed for each social media element gathered by web crawling or other approach.

The method 700 may include detecting 702 product features in content. This may include identifying terms in the content that correspond to one or more product terms 116c in the dictionary 114. For example, an entry for a product may list a manufacturer name for the product and may list a set of features attributes, nicknames, or other data that may be used to identify the product. Accordingly, step 702 may include identifying reference to a product and references to one or more features of the product based on matching text of the content to text of an entry corresponding to the product.

The method 700 may include processing the content according to the classifier 124 in order to determine 704 sentiment associated with the product features. For example, for each product feature identified, the text corresponding to that product feature (e.g. a sentence or paragraph referencing the product feature) may be processed and input to the classifier 124 to determine a sentiment for that product feature. For example, the text for a product feature may be processed according to the method 600 of FIG. 6.

The method 700 may further include determining 706 any explicit rating of a product feature, e.g. two stars, five stars, etc. Determining 706 whether an explicit rating may include evaluating the content. A format of the content may include a plurality of headers or footers encapsulating text and that include an associated rating. Accordingly, where text relating to a product feature is included in a section having a rating associated with it, that rating may be determined 706 to be an explicit rating for that product feature. For well-used sites, human-generated rules may be used to extract the ratings for product features based on a known format of a product review.

The method 700 may include generating 708 a combined product score for product features for which an explicit rating is found. For example, the output of the classifier may be combined with the explicit rating by averaging, weighted averaging, or some other function. Where the output of the classifier is on a different scale than the explicit rating, one of them may be scaled to match the other. For example, if the classifier 124 outputs a value from 0 to 10 and the explicit rating is a value from 0 to 5 stars, the explicit rating may be multiplied by two prior to combining with the output of the classifier 124.

In instances where a reviewer provides an overall rating for a product, this value may be ignored when determining sentiment for a particular feature. In other embodiments, this overall rating may be combined with the output of the classifier 124, which may include averaging, weighting and averaging, and scaling to match the scale of the classifier 124 as described above. In general, the overall rating will be weighted less than a product feature-specific rating.

A sentiment determination according to the method 600 or 700 may be output as a sentiment summarization 126 that lists some or all of the original content 128 that the output is based on, product features 130a-130b referenced by the content, and the sentiment 132a-132b determined for each product feature according to the method 600 or 700. The sentiment summarization 126 may be outputs in a human readable form such as by displaying it on a display screen or including it in a message transmitted by email or some other messaging system.

Figure 8:
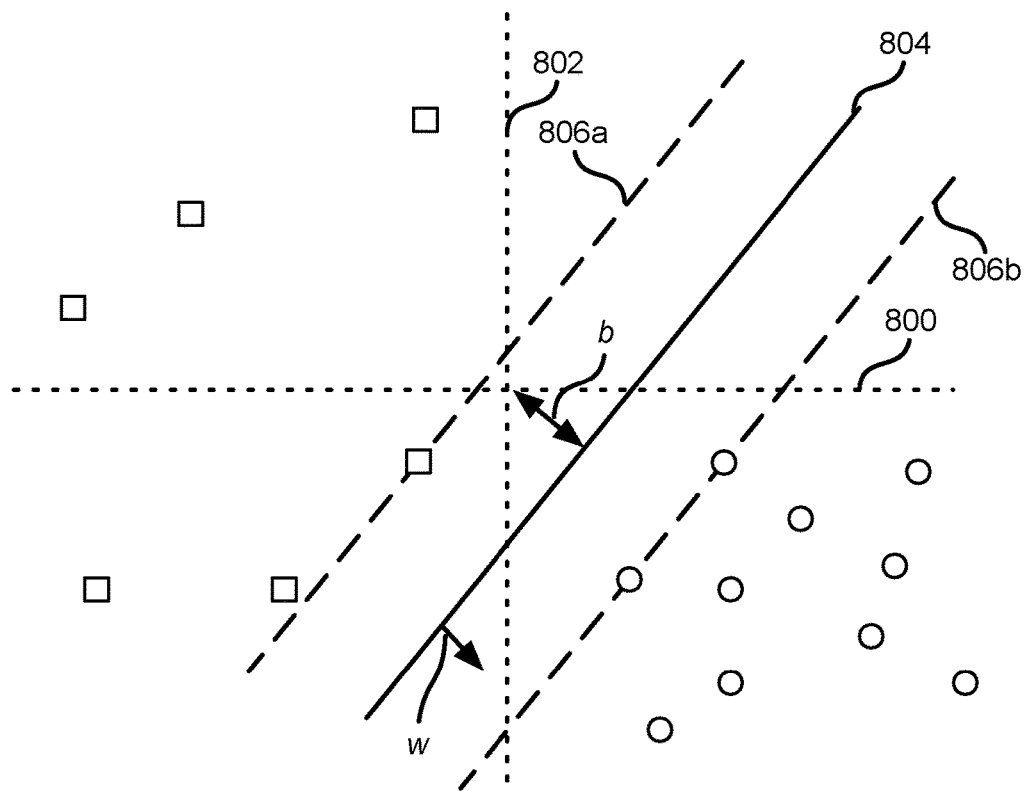
FIG. 8 is a graph illustrating operation of a support vector machine (SVM) machine learning algorithm.

Referring to FIG. 8, various machine learning algorithms may be used to implement the classifier 124, such as a support vector machine (SVM) model, a Bayesian model, and a Bernoulli naïve Bayesian model. The machine learning algorithm ingests the training data and generates 510 a sentiment classifier 124.

For example, a direct Bayesian classifier may have the format of (1)

$$\hat{c} = \arg\max_{c \in C} P(d|c)P(c) = \arg\max_{c \in C} (P(s_1, s_2, \ldots, s_n|c)P(c) \quad (1)$$

where:
d is the text review (social media element);
$s_i$ are the key sentiment words in the text (extracted sentiment-indicating features);
c is the sentiment orientation, e.g. positive or negative; and
C is a collection of all sentiment orientations, e.g. the range of possible values for a sentiment (0 to N, for example).

Assuming that the key sentiment words $s_i$ in the text d are all independent, then the Bernoulli naïve Bayesian classifier of (2) may be used.

$$\hat{c} = \arg\max_{c \in C} (P(s_1, s_2, \ldots, s_n|c)P(c) = \arg\max_{c \in C} P(c)\Pi_{i=1}^n (s_i|c) \quad (2)$$

FIG. 8 illustrates a SVM approach. An SVM seeks to minimize (3)

$$\min_{w,b} \frac{\sqrt{w^T w}}{2}, \text{ s.t. } y_i(x_i^T w + b) \geq 1 \quad (3)$$

where:
$x_i$ is simple text in the training set that is a vector containing multiple words $(s_{i1}, s_{i2}, \ldots, s_{in})$;
$y_i$ is a label (e.g. manual sentiment label) of sampled text $x_i$; and
w is a weight factor associated with each dimension of $x_i$. Graphically speaking, it determines the direction/slope of the solid line 804 in FIG. 8

Each point (square and circle) in the plot of FIG. 8 represents a training data entry. Because $x_i$ is a vector of multiple words, the horizontal and vertical axes 800, 802 represent one of the (mathematically coded) words, respectively. FIG. 8 is only an illustration of two axes, but in reality it will be a multi-dimensional space as there are typically more than two sentiment words in a review.

The square data points represent text that has been labeled as positive. The round data points represent text that has been labeled as negative. The sentiment classifier corresponds to line 804 that separates the positively labeled points from the negatively labeled points. Lines 806a, 806b represent a margin about the classifier with the distance form line 804 being calculated as $2/\sqrt{w^Tw}$. This margin is to be increased by the algorithm and approach a maximum value. Equivalently, the algorithm will iteratively approach a minimum for the value of $\sqrt{w^Tw}/2$.

FIG. 8 illustrates a process of finding a border (the solid straight line 804) to separate two types of text, positive (square) and negative (round). As mentioned above, w determines the slope of the line 804, and b determines the exact location of the line (that is, how far the line is away from the origin of the axis).

Both w and b are to be determined. SVM uses an optimization algorithm to try different values of w and b, and eventually finds values of w and b that provide an increased margin approaching a maximum value (that is, iteratively increasing $2/\sqrt{w^Tw}$, or equivalently iteratively decreasing $\sqrt{w^Tw}/2$), while satisfying the constraint that $y_i(x_i^Tw+b) \geq 1$. This iterative decrease process is expressed in (3) above.

Figure 9:
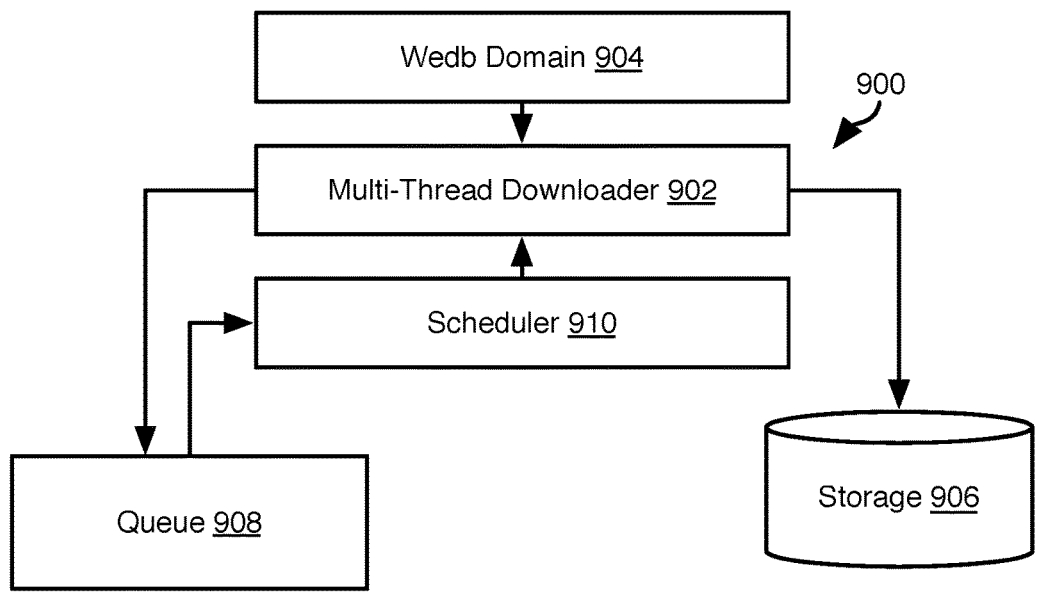
FIG. 9 is a schematic block diagram of an architecture for downloading content from URLs in accordance with an embodiment of the present invention.

FIG. 9 illustrates an example architecture 900 for gathering web content. The illustrates architecture 900 may be implemented by the server system 102 or some other computer system. The architecture 900 includes a multi-thread downloader 902 that implements multiple threads of execution, each of which is tasked to download content from a web domain 904 hosting a particular URL (uniform resource locator) corresponding to user-generated content such as a forum, microblog, social media site, or the like. A particular website may be represented by multiple URLs that reference different portions of content available from the website.

Content retrieved by each thread is stored in storage 906. The stored content is then processed according to the methods described above. Upon completing downloading of content from a URL, the URL is added to a queue 908. A scheduler 910 retrieves a URL from the queue, such as on a first in first out (FIFO) basis, and invokes retrieval of content referenced by the URL by one of the threads of the multi-thread downloader 902.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising, by a computer system:
receiving a plurality of first social media elements;
receiving manual sentiment classifications of the plurality of social media elements;
extracting first features from the plurality of first social media elements, the first features being sentiment-indicating text;
training a classifier according to the manual sentiment classifications and the first features;
receiving, by the computer system, a plurality of second social media elements; and
for each element of the plurality of second social media elements performing, by the computer system:
extracting second features from the each element;
identifying one or more product features referenced in the each element;
inputting portions of the second features corresponding to each product feature of the one or more product features into the classifier to obtain a sentiment estimate for the each product feature; and
for each product feature of the one or more product features, combining the sentiment estimate for the each product feature with an explicit rating of the each element received from a user that generated the each element.

2. The method of claim 1, wherein extracting the first features from the plurality of first social media elements comprises identifying, by the computer system, terms in the social media elements corresponding to entries in a dictionary of sentiment terms.

3. The method of claim 2, further comprising:
identifying, by the computer system, a first portion of the sentiment terms in a formal dictionary; and
identifying, by the computer system, a second portion of the sentiment terms in one or more sources of jargon terms.

4. The method of claim 3, wherein the formal dictionary and the one or more sources of jargon terms contain definitions for Chinese characters.

5. The method of claim 1, further comprising, for each element of the plurality of social media elements:
segmenting the element into segments;
tagging the segments with part-of-speech tags according to a natural language processing (NLP) algorithm; and
extracting the first features for the each segment from the segments and part-of-speech tags.

6. The method of claim 1, wherein receiving manual sentiment classifications of the plurality of social media elements comprises receiving, for each social media element of the social media elements, a numerical value such that higher values indicate a more positive sentiment.

7. The method of claim 1, wherein training the classifier according to the manual sentiment classifications and the features comprises training one of a support vector machine (SVM) model, a Bayesian model, and a Bernoulli naïve Bayesian model.

8. A computer system comprising one or more processing devices and one or more memory devices operably coupled to the one or more processing devices, the one or more memory devices storing executable code effective to cause the one or more processing devices to:
receive a plurality of first social media elements;
receive manual sentiment classifications of the plurality of social media elements;
extract first features from the plurality of first social media elements, the first features being sentiment-indicating text; and
train a classifier according to the manual sentiment classifications and the first features;
wherein the executable code is further effective to cause the one or more processing devices to:
receive a plurality of second social media elements;
extract second features from the plurality of second social media elements; and
associate a sentiment estimate with each element of the plurality of second social media elements by inputting the second features of the each element to the classifier;
associate the sentiment estimate with the each element by identifying an explicit rating associated with the each element received from a user that generated the each element and calculating the sentiment estimate as a combination of the explicit rating and an output of the classifier for the second features of the each element.

9. The computer system of claim 8, wherein the executable code is further effective to cause the one or more processing devices to extract the first features from the plurality of first social media elements by identifying terms in the social media elements corresponding to entries in a dictionary of sentiment terms.

10. The computer system of claim 9, wherein the executable code is further effective to cause the one or more processing devices to:
identify the sentiment terms in at least one of a formal dictionary and one or more sources of jargon terms.

11. The computer system of claim 10, wherein the formal dictionary and the one or more sources of jargon terms contain definitions for Chinese characters.

12. The computer system of claim 8, wherein the executable code is further effective to cause the one or more processing devices to, for each element of the plurality of social media elements:
segment the element into segments;
tag the segments with part-of-speech tags according to a natural language processing (NLP) algorithm; and
extract the first features for the each segment from the segments and part-of-speech tags.

13. The computer system of claim 8, wherein the executable code is further effective to cause the one or more processing devices to receive manual sentiment classifications of the plurality of social media elements by receiving, for each social media element of the social media elements, a numerical value such that higher values indicate a more positive sentiment.

14. The computer system of claim 8, wherein the executable code is further effective to cause the one or more processing devices to train the classifier according to the manual sentiment classifications and the features by training one of a supper vector machine (SVM) model, a Bayesian model, and a Bernoulli nave Bayesian model.

15. A computer system comprising one or more processing devices and one or more memory devices operably coupled to the one or more processing devices, the one or more memory devices storing executable code effective to cause the one or more processing devices to:
receive a plurality of first social media elements;
receive manual sentiment classifications of the plurality of social media elements;
extract first features from the plurality of first social media elements, the first features being sentiment-indicating text; and
train a classifier according to the manual sentiment classifications and the first features;
wherein the executable code is further effective to cause the one or more processing devices to:
receive a plurality of second social media elements;
for each element of the plurality of second social media elements:
extract second features from the each element;
identify one or more product features referenced in the each element;
input portions of the second features corresponding to each product feature of the one or more product features into the classifier to obtain a sentiment estimate for the each product feature; and
for each product feature of the one or more product features, combine the sentiment estimate for the each product feature with an explicit rating of the each element corresponding to the each product feature received from a user that generated the each element.

* * * * *